March 3, 1964  H. BEHRENS  3,122,814
TUNNEL KILNS FOR THE CALCINING PARTICULARLY
OF SENSITIVE CERAMIC WARE
Filed Nov. 6, 1961

INVENTOR
HEINZ BEHRENS

*Malcolm W. Fraser*

ATTORNEY

3,122,814
TUNNEL KILNS FOR THE CALCINING PARTICULARLY OF SENSITIVE CERAMIC WARE
Heinz Behrens, 19 Am Weidenpesch,
Cologne-Junkersdorf, Germany
Filed Nov. 6, 1961, Ser. No. 150,461
Claims priority, application Germany Nov. 9, 1960
2 Claims. (Cl. 25—142)

The invention relates to tunnel kilns for the calcining particularly of sensitive ceramic ware. In such kilns the faultless course of the calcining process depends to a great extent on the kiln atmosphere having as uniform a composition as possible over the entire cross section of the kiln duct, and particularly on the smallest possible temperature differences occurring between the lower and the upper region of the cross section of the kiln duct. This is essential particularly for the preheating zone lying ahead of the calcining zone, in order to make sure that the whole charge of the calcining carriage reaches the calcining zone at as uniform a temperature as possible, as well as for the cooling zone, in order to prevent cooling cracks from occurring as a consequence of temperature differences. These requirements are difficult to fulfill with tunnel kilns operated in the conventional manner, wherein the hot gases flow to the preheating zone under the action of the chimney draught, since the hottest combustion gases tend to rise, as follows from simple physical considerations, and accordingly flow into the upper region of the kiln duct, while the cooler ones remain below.

The temperature differences arising therefrom are the more detrimental in their effect since the combustion gases with their temperatures dropping downwardly from the top across the cross-section of the kiln duct tend to take the path of the lowest resistance i.e. not through the charge of the calcining carriage but through the gaps required for safety reasons between the charge and the walls of the kiln duct, without cooling down continuously and sufficiently by heat exchange with the ware to be calcined. Consequently particularly in the region of the roof of the kiln, the gases arrive at much too high a temperature at places of the preheating zone, at which, owing to the difference between their temperature and that of the ware to be calcined, the latter, being comparatively cool, is seriously endangered.

Numerous proposals have been made already which endeavour to attain a more uniform distribution of the temperature conditions over the entire cross section of the kiln duct.

Of these proposals, the proposal to circulate the kiln atmosphere systematically, or to set it into a state of turbulence, respectively, is not suitable owing to the uncontrollable flow conditions resulting, particularly for sensitive ware to be calcined, and moreover requires a comparatively complicated plant.

All those proposals, which are based on the idea of imposing on the flowing combustion gases a prescribed path, namely through the ware to be calcined rather than preponderantly through the free gaps around the charge, have not been able to solve this problem in a fully satisfactory manner.

This applies particularly to the proposal to build partition walls up on the calcining carriages at suitable intervals transversely of the longitudinal axis of the kiln duct, by the suitable arrangement of which the hot gases flowing upward are time and again conducted into the lower region of the kiln duct, and forced to mix there with the cooler gases. This however, entails a considerable disturbance of the draught conditions and, owing to the large heat capacity of these transverse walls as compared with that of the charge, leads to unbearable temperature fluctuations in the calcining zone, quite apart from the consumption of heat by them, which is not utilised for the calcining process.

Likewise, the proposal of providing on the calcining carriage in the region of the terminal regions at the entrance and exit a slide taking part in the travel through the kiln over a limited stretch only, does not lead to a fully satisfactory result, even when the sealing effect of these slides is assisted by resilient seals of rubber, bushes, or the like co-operating with them, with which seals, the walls of the kiln duct are provided at some stretches, quite apart from the considerable expense in manual labour involved in fitting and removing the slides.

A local constriction of the kiln duct to the profile of the charge on the calcining carriage by annular projections from the walls, i.e. the stationary mechanical obturation of the dangerous free gaps is not possible since the distance between the charge and the walls of the kiln duct has to be kept for reasons of safety.

The further known measure of fitting resilient strips into the charge for the purpose of forcing the kiln gases to flow through the charge, which strips contact the roof of the kiln and scrape along the latter, likewise leads only to an imperfect success. The same applies to the inverse arrangement of such strips attached at major intervals on the roof of the kiln and scraping over the charge. In this arrangement of strips fixed at intervals to the roof of the kiln and scraping over the charge the disadvantage makes itself felt that these strips jerk back from their deflected position when passing over gaps in the charge, thus displace themselves beyond the perpendicular direction to the tunnel kiln axis with respect to the direction of conveying of the calcining carriage. Thereby they may get into another gap of the charge of the calcining carriage and thereby, upon the further advance of the calcining carriages, apply forces to the charge which may cause the same to collapse. This is where the invention comes in, according to which it is proposed to eliminate this danger by limiting the freedom of movement of the plate elements with respect to the direction of conveying of the calcining carriages in such a manner that their jerking back beyond the perpendicular line to the axis of the tunnel kiln is prevented.

Preferably the plate elements are attached with respect to the perpendicular direction to the tunnel axis, in principle inclined in the direction of conveying.

Conveniently the plate elements are arranged at such short intervals from one another that they relieve one another alternately in their action, i.e. that at any time a plurality of such plate elements acts simultaneously on the charge of a calcining carriage, while another number of them engages into gaps, if any, of the charge, but can move upon continued advance of the calcining carriages without difficulties out of such gaps owing to the inherent obliqueness of these plates.

These plate elements may consist of sheet metal. In case it is desirable, particularly for sensitive ware to be calcined to effect the obturation of the kiln duct by means of temperature-resistant materials, plates, cloth or the like of asbestos is used, which then may be used up to a temperature of about 575° C. They effect not only, as will be seen, the desired equal temperature distribution in the preheating zone, but prevent also at the cooling terminal part of the kiln cold air from penetrating too far into the interior of the kiln duct, in certain circumstances even into critical cooling regions.

These obturators described as "air brakes" have to bear on the ware to be calcined, over which they scrape, with the minimum possible pressure. For this reason these "air brakes" are subdivided into as high as possible a number of individual plates, capable of being swung out independently of one another in the direction of conveying.

In the accompanying drawings an embodiment of a tunnel kiln having the characteristics of the present invention is illustrated by way of example in part-sections, of which:

Figure 1:
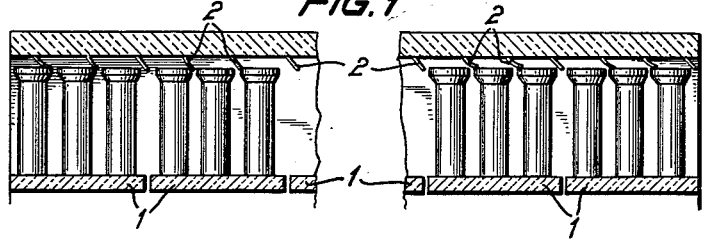
FIGURE 1 is a longitudinal section of the kiln duct wherein merely the terminal zones at the entry and outlet are shown.
Figure 2:
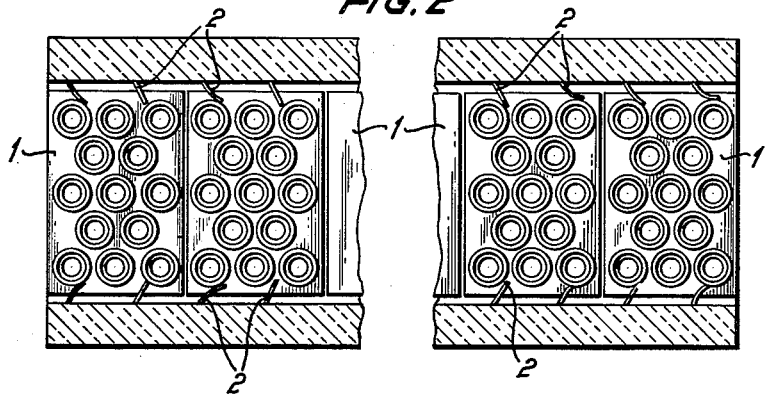
FIGURE 2 is a sectional plan view to FIGURE 1.

As shown in FIGURES 1 and 2, omitting all details not required for the understanding of the invention, in a tunnel kiln for the calcining of stoneware pipes, the side walls and the ceiling of the kiln duct are provided with sheet metal plates 2 capable of swinging out, against spring bias, in the direction of conveying of the calcining carriages 1, which are so arranged and constructed that they scrape over the ware to be calcined, i.e. according to this embodiment over the muffle ends and walls of the pipes to be calcined in an upright position.

The intervals between the plates succeeding one another in the direction of conveying are to be as short as possible so that the plates relieve one another in their action but should be sufficient to make sure that the plates cannot interfere with one another in case one plate gives way earlier than another owing to the contours of the charge.

As will be seen, the sealing plates 2 are arranged at such intervals in the longitudinal direction of the kiln duct, that at least three such seals are provided for one length of a calcining carriage.

The zone, beginning at the entry and on the outlet, constructed in such a way, extends into the temperature range of at least 300° C., preferably even deeper at the entry zone, in which case the pivotable sealing plates have to consist of an appropriate temperature resisting material.

Figure 3:
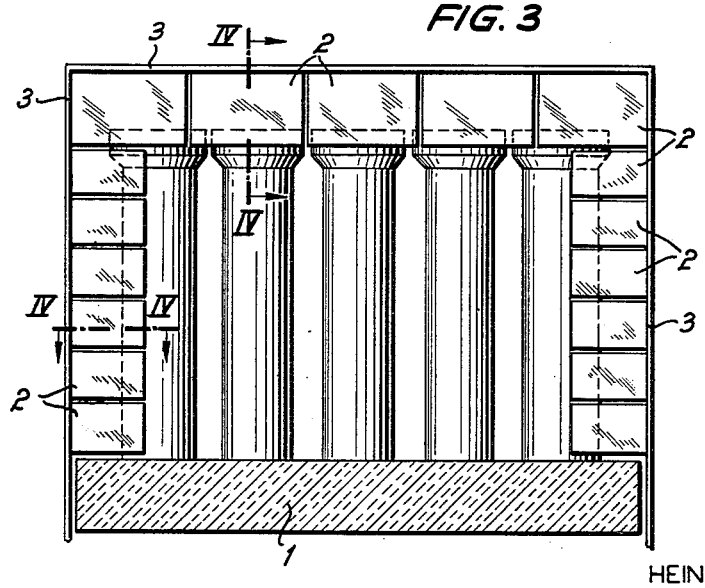
FIGURE 3 shows a cross section of the kiln duct in the region of either the entry or outlet zone, on a larger scale.

FIGURE 3 shows in detail the construction of the walls of the plates monuted pivotally on the kiln duct walls—on attachment irons 3, and in particular shows their dimensions to be kept deliberately small, owing to which the contact pressure applied by each individual plate on the ware to be calcined is only slight.

According to the embodiment the side walls of the kiln duct are provided on both sides with six plates and the ceiling with five plates.

Figure 4:
FIGURE 4 is a diagrammatic section on the lines IV—IV of FIGURE 3 of the attachment of flag-type sealing plates on the side walls or vault of the kiln-duct, respectively.

The manner of attachment of the sheet metal plates illustrated in FIGURE 4 is self-explanatory.

The invention is obviously not limited to the embodiment described hereinabove in detail and illustrated in the figures, but modifications thereof are possible without departing from its principle.

I claim:

1. A tunnel kiln, particularly for the calcining of sensitive ceramic ware, having guiding means arranged in the interior of the kiln duct, which block the path of the combustion gases flowing from the calcining zone to the preheating zone and/or the cold air flowing in at the cooling end along the side walls and the roof of the kiln duct, and thus force the gases to flow through the charge, the gaps between the ware to be calcined and the side walls as well as the roof of the tunnel kiln being provided with plate elements resiliently yielding in the direction of conveying of the calcining carriages and scraping over the ware to be calcined itself, and thereby establishing a complete seal, said plate elements being limited in their freedom of movement in relation to the calcining carriages to be prevented from jerking back beyond the direction perpendicular to the direction of conveying.

2. A tunnel kiln according to claim 1, wherein said plate elements are inclined in the direction of conveying of the calcining carriages to the direction perpendicular to the tunnel axis.

References Cited in the file of this patent

UNITED STATES PATENTS

| | | |
|---|---|---|
| Re. 15,273 | Fuller | Jan. 24, 1922 |
| 2,514,143 | Robson | July 4, 1950 |
| 2,899,189 | Matis et al. | Aug. 11, 1959 |
| 2,977,106 | Duff | Mar. 28, 1961 |